United States Patent
Morend et al.

(10) Patent No.: US 10,820,740 B2
(45) Date of Patent: Nov. 3, 2020

(54) BEVERAGE PREPARATION MACHINE COMPRISING LOCATION SYSTEM

(71) Applicant: NESTEC S.A., Vevey (CH)

(72) Inventors: Joel Morend, Chatonnaye (CH); Saad Siddiqi, Yverdon-les-Bains (CH)

(73) Assignee: Societe des Produits Nestle S.A., Vevey (CH)

( * ) Notice: Subject to any disclaimer, the term of this patent is extended or adjusted under 35 U.S.C. 154(b) by 279 days.

(21) Appl. No.: 15/772,281

(22) PCT Filed: Nov. 1, 2016

(86) PCT No.: PCT/EP2016/076291
§ 371 (c)(1),
(2) Date: Apr. 30, 2018

(87) PCT Pub. No.: WO2017/076828
PCT Pub. Date: May 11, 2017

(65) Prior Publication Data
US 2018/0310750 A1  Nov. 1, 2018

(30) Foreign Application Priority Data
Nov. 6, 2015  (EP) .................................. 15193385

(51) Int. Cl.
*A47J 31/32* (2006.01)
*A47J 31/44* (2006.01)
*A47J 31/52* (2006.01)

(52) U.S. Cl.
CPC .......... *A47J 31/32* (2013.01); *A47J 31/4403* (2013.01); *A47J 31/52* (2013.01); *A47J 31/521* (2018.08); *A47J 31/525* (2018.08); *A47J 31/5253* (2018.08); *A47J 31/5255* (2018.08)

(58) Field of Classification Search
CPC ........ A47J 31/32; A47J 31/521; A47J 31/525; A47J 31/5253; A47J 31/5255; A47J 31/52; A47J 31/4403
See application file for complete search history.

(56) References Cited

U.S. PATENT DOCUMENTS

2015/0230653 A1  8/2015  Cheng
2015/0305551 A1  10/2015  Rosati et al.
(Continued)

*Primary Examiner* — John C Hong
(74) *Attorney, Agent, or Firm* — K&L Gates LLP

(57) ABSTRACT

A beverage preparation machine for preparing at least one beverage from a beverage material includes a modem for communication with a remote resource such as a server, and is configured to send machine remote management data to the remote resource. The machine comprises location system configured for automatic geolocation of the machine, and is configured to send to the remote resource location information determined by the location system. This for example makes it possible to confirm or correct the location of a machine, to correct mistakes that can occur when a machine is installed or moved, or to take appropriate measures when a machine is stolen. In another embodiment, a system includes such a beverage preparation machine and a remote resource with which it is configured to communicate. In a further embodiment, a method is provided for remote management of a beverage preparation machine.

13 Claims, 5 Drawing Sheets

(56) References Cited

U.S. PATENT DOCUMENTS

2015/0356536 A1* 12/2015 Yoakim .................. A47J 31/52
705/26.81
2019/0125123 A1* 5/2019 Startz ..................... A47J 31/42
2020/0100616 A1* 4/2020 Herbert ................ A47J 31/405

* cited by examiner

BEVERAGE PREPARATION MACHINE COMPRISING LOCATION SYSTEM

CROSS REFERENCE TO RELATED APPLICATIONS

The present application is a National Stage of International Application No. PCT/EP2016/076291, filed on Nov. 1, 2016, which claims priority to European Patent Application No. 15193385.0, filed on Nov. 6, 2015, the entire contents of which are being incorporated herein by reference.

TECHNICAL FIELD

The present invention relates to a system for the preparation of a beverage. It relates more particularly to beverage preparation machines which are intended for intense use and installed in public places or, for example, in a corporate establishment. Such machines are generally leased, and are refilled and maintained by the lessor. They are often called professional machines. The invention relates in particular to the remote management of such machines.

BACKGROUND OF THE INVENTION

Beverage preparation machines that are generally used in public or corporate establishments vend a beverage, for instance, coffee, tea or soup, to a user upon the selection by the user of a desired beverage.

Such beverage preparation machines are generally configured to operate using a dose of a soluble powder that comprises an ingredient of the beverage and is dispensed from a container of the beverage preparation machine, examples of which are provided in WO 2013/014142 and WO 2010/034722. The soluble powder is at least partially dissolved by mixing with a solvent, typically water or milk, and dispensed into a receptacle, e.g. a cup of a user. These beverage preparation machines may alternatively use other types of beverage material, such as ground coffee, tea, etc. Thus, the present invention may also encompass the so-called "brewing" process of beverage preparation—particularly for tea and coffee. Brewing involves the infusion over time of the ingredient in a fluid, most commonly hot water, whereas extraction or dissolution preparations produce a beverage within a few seconds. For purposes of clarity, however, in this document the term "brewing" of an ingredient by a fluid is understood to encompass extraction of a powdered edible material (e.g. roast and ground powdered coffee), dissolution of edible soluble material (e.g. soluble tea, coffee, milk, or cocoa), or the infusion of an edible material in an infusion fluid under very low or atmospheric pressure, for a longer time than that required for extraction or dissolution (e.g. tea leaves in hot water).

The beverage ingredient may be provided in bulk or in individual packages such as capsules. A capsule is meant to include any pre-portioned beverage ingredient within enclosing packaging of any material, in particular air tight packaging, e.g. plastic, aluminium, recyclable and/or bio degradable packaging, and of any shape and structure, including soft pods or rigid cartridges containing an ingredient.

The machine may be configured to communicate with remote resources (e.g. servers) to transmit data for the machine management, such as the remaining levels of powders or cups, statistical data on use of the machine, failure warnings, and so on.

To communicate the collected data, the machine is generally provided with a modem, which may be a GPRS (for "General Packet Radio Service") modem. Such a GPRS modem uses the wireless communication network used for mobile phone communication. When necessary, at predefined intervals or continuously, it calls a remote server to communicate the collected data over the wireless network.

When a maintenance or repair operation has to be performed on a machine, a maintenance operator may be notified and sent to the machine location. The operator has to search for the machine in a database to locate it, according its position when installed.

However, mistakes sometimes exist in the database. For example, a wrong location may have been entered, because it is a manual operation. For some reason, a machine may be moved to another location, or a machine may be replaced by another, without update of the database. A machine may also be stolen.

INVENTION SUMMARY

The present invention is directed to easing and optimizing the management of a professional beverage preparation machine. It provides in particular a solution to the above-mentioned problems. It also provides, in some embodiments, new management features for such machines.

In particular, the invention relates to a beverage preparation machine for preparing at least one beverage from a beverage material. The machine comprises a communication interface, such as a modem, for communication with a remote resource (e.g. a server system that may be embodied has hardware and/or software or a peer to peer network). The machine may be configured to send machine remote management data to said remote resource via the communication interface. The machine further comprises a location system configured for automatic geolocation of the machine, and is configured to send to the remote resource, via the communication interface, location information determined by said location system.

The machine is thus configured to be connected to a remote resource and to provide, for example, upon request from the remote resource or at predefined time intervals, information on its location. This is useful in many circumstances, e.g. to confirm or correct the location of a machine, to correct mistakes that can occur when a machine is installed or moved, or to take appropriate measures when a machine is stolen/moved without authorisation.

The communication interface may comprise a modem. The modem may be a wireless modem configured to communicate over a cellular network. The location system may comprise said wireless modem, the location system being configured to provide location information based on multilateration in the cellular network.

Alternatively or in addition, the location system may comprise a satellite-based positioning system. It may in particular comprise a Global Positioning System (GPS).

The invention also relates to a system for beverage preparation comprising a beverage preparation machine as previously described and a remote resource to which said machine is configured to transmit the location information and optionally machine remote management data. The remote resource hosts a database comprising a human entered location of the machine.

The system may be configured for comparing the location of the machine from the database and a location determined by the location system. In an embodiment of the system, if a discrepancy between the location of the machine from the database and a location determined by the location system is detected, then:
- if the location from the database is judged to have been input incorrectly or to be out of date, the system allows an operator at remote resource to enter a corrected location or to accept the location sent by machine; and/or
- if the machine does not determine a machine location correctly due to an error with its location system, make the system use the location of the machine from the database (e.g. overriding the determined location notification).

Optionally, if the machine has been moved without authorisation, e.g. one of the above logic conditions is not executed, for example if the machine has been stolen then the new location is not accepted and the machine can be disabled, and a warning message may be sent to machine and optionally displayed on an end user interface of the machine.

The comparison is preferably made by a system distant from the machine (e.g. the server). This limits the operation executed by the beverage preparation machine for its own remote management.

In other embodiments of the invention, the comparison may be made by the beverage preparation machine. For example, the machine may comprise a module for comparison between the location of the machine from the database and a location determined by the location system.

The invention further relates to a method for remote management of a beverage preparation machine for preparing at least one beverage from a beverage material, said machine comprising a communication interface, such as a modem, for communication with a remote resource (e.g. a server system that may be embodied has hardware and/or software or a peer to peer network) and being configured to transmit location information and optional machine management data to said remote resource. The method comprising obtaining automatic location information from location system comprised by the machine, and using said location information for a remote management operation of the machine.

The remote management operation may comprise a comparison between the location of the machine issued from a database comprising human entered location data and a location determined by the location system. A discrepancy is detected when the distance between the location of the machine from the database and a location determined by the location system exceeds a predefined threshold.

In typical embodiments of the method, the threshold may be set to:
- between 500 m and 20 km, preferably between 10 km and 20 km, and for example to 15 km, if the automatic geolocation of the machine relies on multilateration in a cellular network;
- between 100 m and 1 km, and preferably to 500 m if the automatic geolocation of the machine uses a satellite-based positioning system.

Depending on the number of base stations in the considered area, the multilateration system may have a good or poor resolution or precision. For example, the multilateration can operate with a resolution of 200 m in areas where there are lots of base stations and with a far lower resolution of 50 km where there is not—e.g. in the mountains. A typical threshold for judging of a discrepancy, when using multilateration, may be set to between 500 m and 50 km. It may be generally chosen between, 10 km and 20 km. For example a threshold of 15 km may be used. When a machine is installed in an area in which the precision of multilateration is expected to be good, a lower threshold may be used, for example, 1 km, 2 km, 5 km. When using a GPS or a similar location system, typical threshold values may be chosen between 100 meters and 1 km. For example a 500 m threshold may be used.

The management operation may comprise, if a discrepancy between the location of the machine from the database and a location determined by the location system is detected:
- if the location from the database is judged to have been input incorrectly or to be out of date, allowing an operator at remote resource to enter a corrected location or to accept the location sent by machine; and/or
- if the machine does not determine a machine location correctly due to an error with its location system, make the system use the location of the machine from the database.

If a discrepancy between the location of the machine from the database and a location determined by the location system is detected and if the machine is judged to have been moved without authorisation, then the machine may be remotely disabled, and/or a warning item is sent to machine and displayed on an end user interface.

In an embodiment of the method, the location information may be sent by the machine upon reception of a request from the remote resource, and/or at predetermined time intervals.

The method may comprise remote management data being transmitted from the machine (i.e. via the communication interface) to the remote resource, preferably in combination with the location information. Said data are selected from a group comprising: data requesting maintenance/repair machine (4); data to diagnose a fault of the machine (e.g. scaling of the fluid supply; a fault of an electrical component such as the heater); data related to consumption of beverage material or other consumable used by the machine (e.g. milk or water). In response to receiving said data, the method may comprise; the remote resource sending a notification to a user/operator of the machine or a service technician (e.g. by email or phone).

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

For a better understanding of the invention, and to show how embodiments of the same may be implemented, reference will now be made, by way of example, to the accompanying diagrammatic drawings in which.

DETAILED DESCRIPTION OF EXEMPLARY EMBODIMENTS

Figure 1:
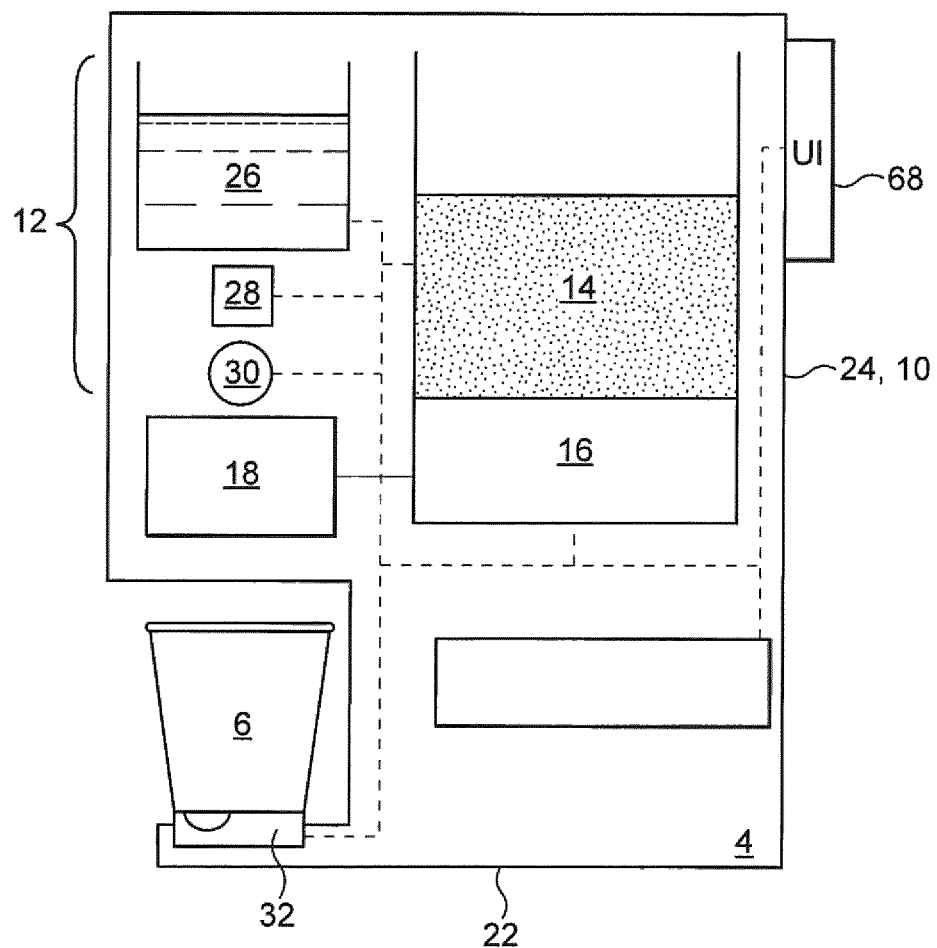
FIG. 1 is an illustrative view of a beverage preparation system that comprises a beverage preparation machine and a receptacle 6.

FIG. 1 shows an illustrative view of a beverage preparation system 2, which comprises at a first level: a beverage preparation machine 4; and a receptacle 6.

Beverage Preparation Machine

Functionally, the beverage preparation machine 4 is operable to process beverage material, generally from a large re-fillable container, to dispense one or more ingredients of the beverage into the receptacle 6 (e.g. a cup, which is typically plastic or cardboard). Typically the beverage material is a soluble powder, which is at least partially dissolved by mixing with a solvent, typically water or milk. The beverage preparation machine 4 may be dimensioned for use on a work top, i.e. it is less than 100 cm in length, width and height or to operate as part of a freestanding unit. Examples of suitable beverage preparation machines 4 are disclosed in WO 2013/014142 and WO 2010/034722. For completeness and only as an example, such a beverage preparation machine 4 will now be described in more detail, and can be considered to comprise at a first level of the beverage preparation machine 4: a housing 10; a fluid supply 12; a beverage material container 14; a beverage material processing unit 16; a dispensing unit 18; and a control system 20. These components are now sequentially described in more detail.

Housing

The housing 10 houses and supports the aforementioned first level components and comprises at a second level of the beverage preparation machine 4: a base 22 for abutment of a horizontally arranged support surface; and a body 24 for mounting thereto the other first level components.

Fluid Supply

The fluid supply 12 is operable to supply fluid, which is in general water that is heated, to the dispensing unit 18. The fluid supply 12 typically comprises at a second level of the beverage preparation machine 4: a reservoir 26 for containing fluid, which in most applications is 1-5 litres of fluid; a fluid pump 28, such as a reciprocating or rotary pump that may be driven by an electrical motor or an induction coil; a fluid heater 30, which generally comprises a thermo block type heater; an outlet for supplying the fluid to the dispensing unit 18, which will be discussed. The reservoir 26, fluid pump 28, fluid heater 30, and outlet are in fluid communication with each other in any suitable order. In an alternative example the fluid supply 12 may comprise a connection to an external fluid source e.g. a water main.

Beverage Material Container

The beverage material container 14 is for containing the beverage material, which in most applications is 1-2 litres. The container it typically refillable or replaceable for the supply of new beverage material to the beverage preparation machine 4.

Beverage Material Processing Unit

The beverage material processing unit 16 is operable to extract a predetermined dose of the beverage material (e.g. powder) from the beverage material container 14, and to supply the said dose to the dispensing unit 18. Accordingly, the beverage material processing unit 16 comprises a processing mechanism, such as an auger driven by an actuator, or other suitable mechanism.

Dispensing Unit

The dispensing unit 18 is operable to dispense fluid from the fluid supply 12 and beverage material from the beverage material processing unit 16 to the receptacle 6. In one example it comprises one or more fluid outlet nozzles for dispensing the said fluid into the receptacle together with a separate beverage material outlet for the said beverage material, such an example is disclosed in more detail in WO 2010/034722. In such an example the fluid nozzles and beverage material outlet can be arranged discrete from another, such that the beverage material is firstly dispensed into the receptacle, and subsequently the receptacle is moved to receive the fluid. In an alternative example the dispensing unit 18 comprises a mixing unit and one or more nozzles, the mixing unit to mix the beverage material and fluid prior to them being dispensed through the or each nozzle, such an arrangement is known in the state of the art.

Control System

Figure 2:
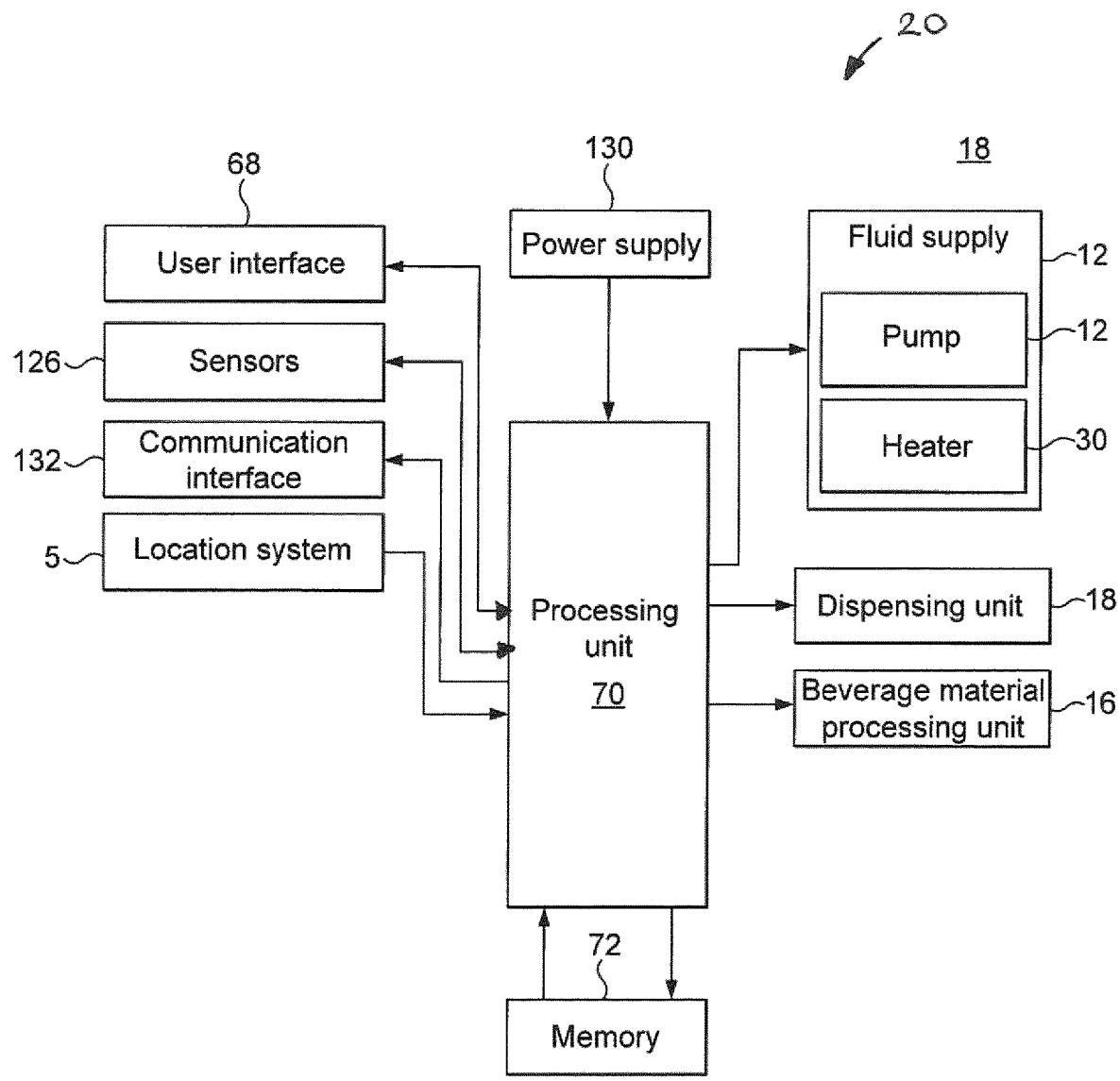
FIG. 2 is a schematic representation of an embodiment of the control system of the beverage machine of FIG. 1.

With reference to FIG. 2, the control system 20 will now be considered. The control system 20 is operable to control the other first level components to perform a beverage preparation operation. The control system 20 typically comprises at a second level of the beverage preparation machine 4: a user interface 68; a processing unit 70; optional sensors 126; and a power supply 130; which are hereafter described.

The user interface 68 comprises hardware to enable a user to interface with the processing unit 70, by means of a user interface signal. More particularly, the user interface receives commands from a user; the user interface signal transfers the said commands to the processing unit 70 as an input. The commands may, for example, be an instruction to execute a beverage preparation process and/or to adjust an operational parameter of the beverage preparation machine 4 and/or to power on or off the beverage preparation machine 4. The processing unit 70 may also output feedback to the user interface 68 as part of the beverage preparation process, e.g. to indicate the beverage preparation process has been initiated or that a parameter associated with the process has been selected.

The hardware of the user interface 68 may comprise any suitable device(s), for example, the hardware comprises one or more of the following: buttons, such as a joystick button or push button; joystick; LEDs; graphic or character LCDs; graphical screen with touch sensing and/or screen edge buttons. The user interface 68 can be formed as one unit or a plurality of discrete units. For more complicated hardware configurations the user interface 68 can comprise a separate processing unit (examples of which are provided below) to interface with the master processing unit 70.

The sensors 126 are operable to provide an input signal to the processing unit 70 for monitoring of the beverage preparation process and/or a status of the beverage preparation machine 4. The input signal can be an analogue or digital signal. The sensors 126 typically comprise one or more of the following: fluid level sensors associated with the reservoir 26; flow rate sensors associated with the fluid pump 28; temperature sensors associated with the heater 30; fluid level sensors 70 operable to measure a fluid level in the receptacle 6.

The processing unit 70 is operable to: receive an input, i.e. the commands from the user interface 68 and/or the signal of the sensors 126; process the input according to program code (or programmed logic) stored on a memory unit (discussed later on); provide an output, which is generally a beverage preparation process. More specifically the output may comprise the operation of: the beverage material processing unit 16 (i.e. operation of the processing mechanism to extract a predetermined dose of the beverage material from the beverage material container and to supply the said dose to the dispensing unit 18); water supply 12 (i.e. operation of the fluid pump 28 and fluid heater 30 to supply fluid to the dispensing unit 18); dispensing unit 18 (i.e. to dispense the received fluid and beverage material to the receptacle 6). Operation of the aforesaid components can be open-loop control, or more preferable closed-loop control using the input signal from the sensors 126 as feedback.

The processing unit 70 generally comprises memory, input and output system components arranged as an integrated circuit, typically as a microprocessor or a microcontroller. The processing unit 70 may comprise other suitable integrated circuits, such as: an ASIC; a programmable logic device such as a FPGA; an analogue integrated circuit, such as a controller. The processing unit 70 may also comprise one or more of the aforementioned integrated circuits. An example of the latter is several integrated circuits arranged in communication with each other in a modular fashion e.g. a slave integrated circuit to control the user interface 68 in communication with a master integrated circuit to control the beverage material processing unit 16, beverage material processing unit 16, dispensing unit 18 and water supply 12.

The processing unit 70 generally comprises a memory unit 72 for storage of instructions as program code and optionally data. To this end the memory unit 72 typically comprises: a non-volatile memory e.g. EPROM, EEPROM or Flash for the storage of program code and operating parameters as instructions; volatile memory (RAM) for temporary data storage. The memory unit may comprise separate and/or integrated (e.g. on a die of the semiconductor) memory. For programmable logic devices the instructions can be stored as programmed logic.

The power supply 130 is operable to supply electrical energy to the said controlled components, the processing unit 70 and components associated therewith. The power supply 130 may comprise various means, such as a battery or a unit to receive and store energy from a mains electrical supply. The power supply 130 may be operatively linked to part of the user interface 68 for powering on or off the beverage preparation machine 4.

Communication Interface

The beverage preparation machine further comprises a communication interface 132 for data communication with a remote resource, which may be a server system embodied as hardware and/or software or a peer to peer network. The communication interface 132 can be used to supply and/or receive information relating to the beverage preparation process, such as beverage material consumption information and/or beverage preparation information (e.g. recipes). Generally speaking, the communication interface is directed to transmitting data for remote management of the beverage preparation machine. The remote management information may comprise the above mentioned information related to the remaining level of beverage powder or cups, but also any other information relating to the maintenance of the machine (failure warning, programmed periodic maintenance warning, and so on).

Figure 3:
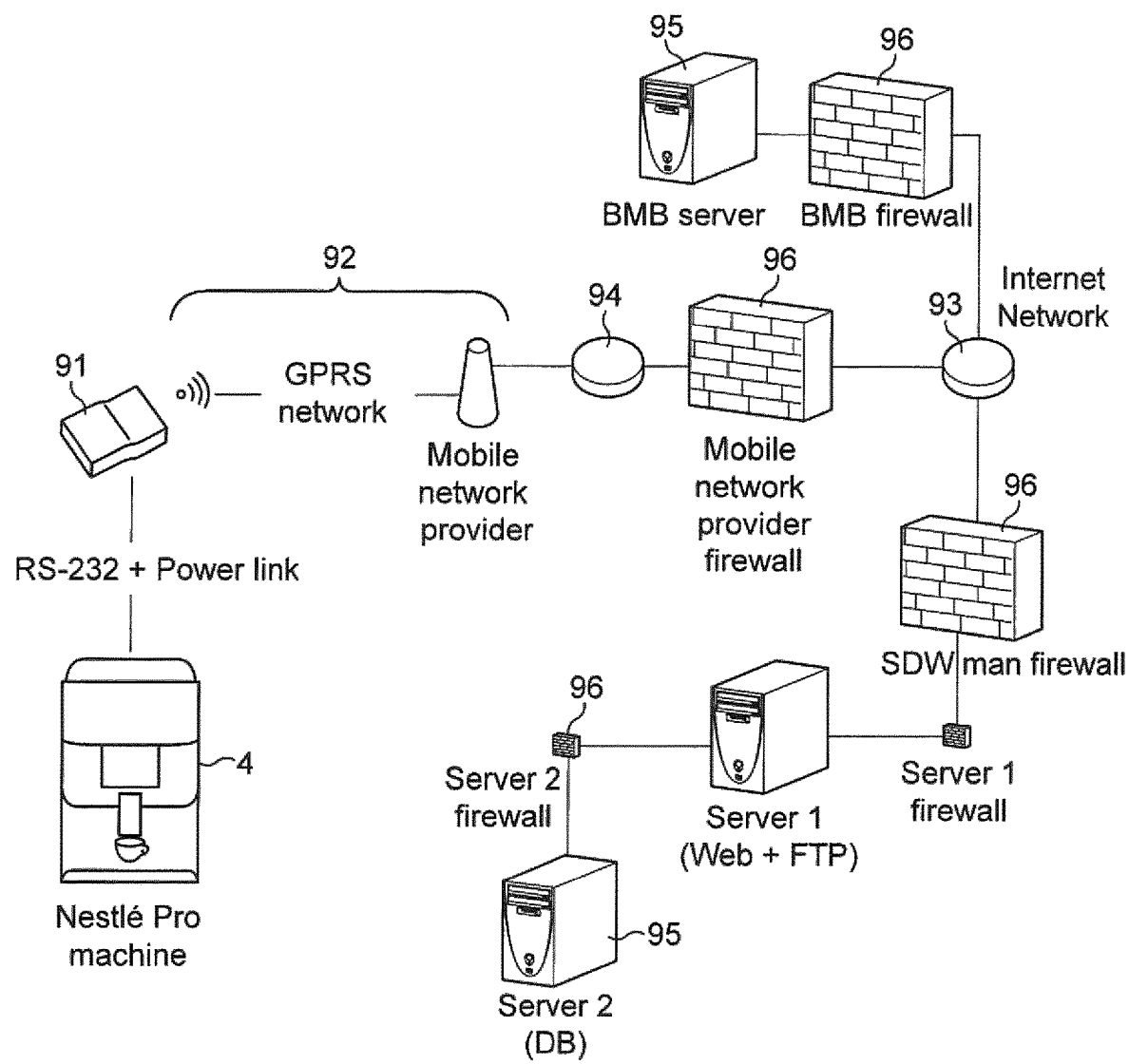
FIG. 3 is a general view of an example of a communication network used by a professional beverage machine according to an embodiment of the invention.

With reference to FIG. 3, the communication interface 132 typically comprises a modem 91 for communication with said remote resource. In particular the modem may be configured for transmission of data through a cellular network, such as GPRS or GSM modem. The communication interface 132 interfaces with the processing unit 70, by means of a communication interface signal. Generally the communication interface comprises a separate processing unit (examples of which are provided above) to control communication hardware (e.g. an antenna) to interface with the maser processing unit 70.

Communication Network

FIG. 3 is a general view of an example of a communication network used by an embodiment of a professional beverage machine. The machine 4 is provided with a modem 91, which is, in the represented example embodiment, a wireless modem for communication over a cellular network 92. The modem may be integrated in the housing 10 of the beverage preparation machine, or may be provided outside said housing 10.

The cellular network, e.g. a GPRS (for General Packet Radio Service) network, is linked to the Internet 93 via a NAT 94 (for Network Address Translator). Communication of data for remote management of the machine to remote servers 95 is performed over the internet 93. Many firewalls 96 may be provided along the data path over the network to enhance security of communication.

Location System of Machine

The beverage preparation machine 4 further comprises a location system 5 for automatic geolocation of the machine and to transmit associated location information to the remote resource (i.e. via the aforesaid communication interface 132). The location system may be of any type allowing an automatic location of the machine.

The location system may be configured to provide location information based on multilateration in a cellular network, (e.g. it comprises a GPRS or GSM modem). Multilateration is a known positioning and navigation technique based on multiple measurements of the difference in distance to two stations at known locations that broadcast signals at known times. This is a common known technique to locate a mobile phone or any other system using a mobile or cellular network. Although not the exact technical term, "triangulation" (between antennas of the cellular network) is often used to designate this technology. Multilateration provides location information of moderate but sufficient accuracy in most cases.

Alternatively, the location system may comprise a satellite-based positioning system, such as a GPS (for Global Positioning System) or any equivalent system. A GPS makes it possible to locate the device provided with said GPS with a high accuracy, but generally has a higher cost than multilateration based location systems. However, the signals from the GPS satellite may be unavailable inside some buildings and in some areas. That is why GPS (or more generally satellites) based automatic location system may be used as an alternative or preferably as a complement of mutilateration. Thus, multilateration can advantageously be used in buildings, typically where the machine is located, where GPS is less accurate. In additional to the GPS system a communication interface for data transfer, e.g. a GPRS modem may be provided.

Remote Resource and Remote Management Process

The remote resource generally comprises a server system that may be embodied has hardware and/or software or a peer to peer network. Said resource is arranged remotely, i.e. at a different location, from the machine. In the example illustrated in FIG. 3, the remote resource is illustrated as a plurality of server devices 95 and firewalls 96. At least one of said servers 95 comprises a location database in which the location of the machine is manually entered. In other words, the location is human entered, which means that the location is entered manually by manually accepting a location provided by the machine, or the full location (e.g. an address) is entered manually. For example, after installation of a machine, the operator who has installed said machine (for example) enters in the database the location of the machine. The interface with the database may be integrated in the beverage preparation machine user interface 68, or be a separate computer interface.

Figure 4:
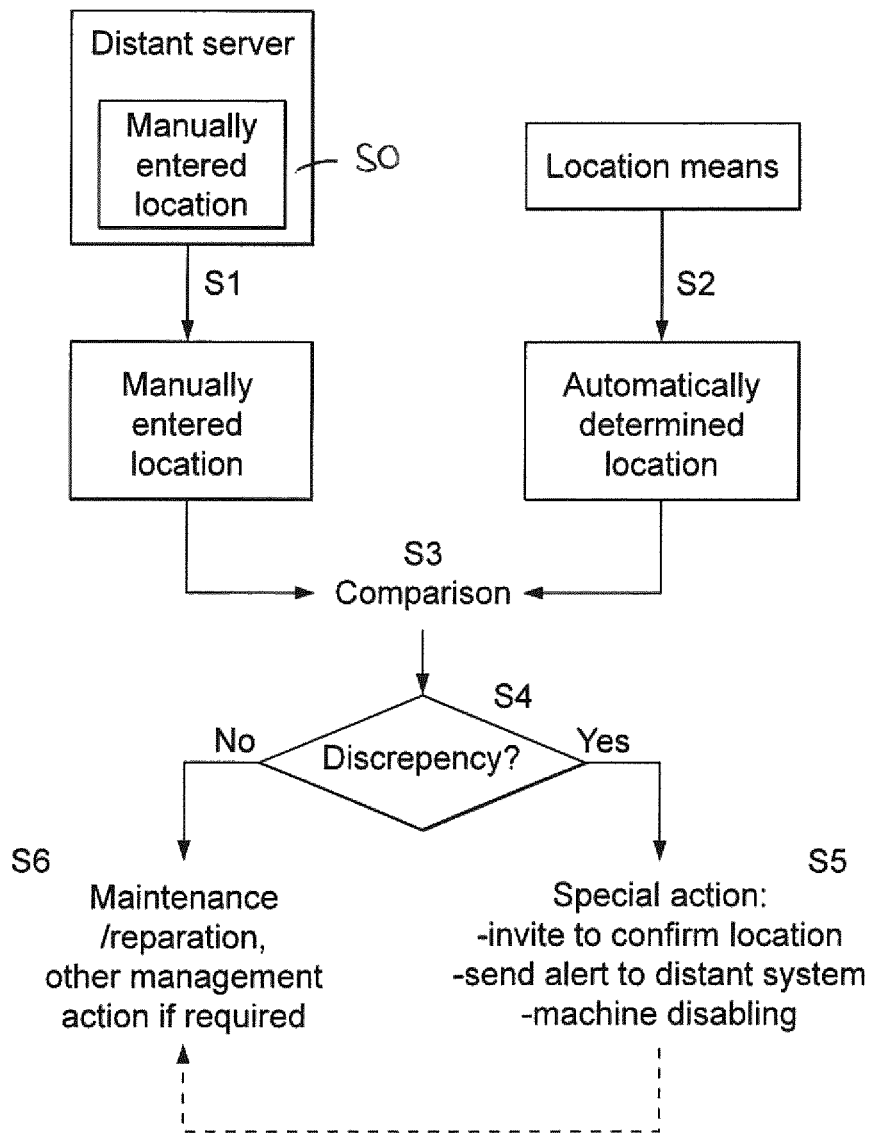
FIG. 4 represents as a block diagram an example of a method for remote management of a beverage preparation machine according to an aspect of the invention.

The beverage machine 4 may be configured to perform part of a remote management process as described in reference to FIG. 4. The remote management process is preferably performed at the remote resource.

As a prerequisite for said process, a location of the machine is manually entered at step S0 in the database hosted by the remote resource.

At launch of the process, i.e. at predefined intervals or in response to a signal from the processing unit emitted due to detection of an event (e.g. detection of a maintenance or repair requirement), the remote resources provides at step S1 the manually entered location corresponding to the beverage preparation machine concerned. In parallel, in step S2, the location system 5 of said beverage preparation machine concerned determines and provides a location of the machine. Typically, the location information is sent by the communication interface 132 of the machine to the remote resource upon reception of a request from the latter, and/or at predetermined time intervals. Thus, the location information is provided by the machine without user input.

The location of the machine from the database and the location of the machine determined by the location system are then compared in a comparison step S3. The comparison is preferably made by a system distant from the machine (e.g. the server). In less preferable embodiments of the invention, the comparison is made by the beverage preparation machine.

Based on the result of the comparison, it is judged in a step S4 whether a discrepancy exists or not between said location of the machine from the database and location of the machine determined by the location system.

It may for example be judged that a discrepancy exists when the distance between the compared locations exceed a predefined threshold. In such case, the threshold may be set depending on the accuracy of the location system.

For example, a high positioning accuracy (some meters at most) is expected when the beverage preparation machine comprises a GPS, while a moderate accuracy (some hundreds of meters to some kilometres) is expected when using a location system based on the architecture of a cellular network (e.g. multilateration).

If no discrepancy in location of the machine is detected, it is judged that the location issued form the database is right. A maintenance or repair operation may be performed if required at step S6: for example, a maintenance operator is sent at the location issued form the database and confirmed by the automatic location by the location system of the machine.

If a discrepancy is detected, one or several special actions are taken at step S5.

A warning may be sent to a remote resource, for example to send an operator to the location provided by the location system to retrieve the machine.

In alternative or complement, a signal may be sent to the beverage preparation machine to make it open or activate an interactive interface inviting to manually confirm or change the location issued from the database. The interactive interface may be the user interface 68 of the machine, i.e. the interface used for beverage choice or beverage options choices, or a maintenance dedicated interface.

As an alternative or in complement, the machine may be locked-out or disabled, e.g. because such a discrepancy may indicate that the machine has been stolen. Disabling of the machine typically comprises the server sending to the client via the network an instruction to disable the user interface 68 of the machine, such that a user cannot execute a beverage preparation process. Thereafter, when a modem 91 of the machine uses a SIM (Subscriber Identity Module), a further instruction to disable the SIM may be sent.

Depending on the result of the special action(s) taken (e.g. a user has manually changed the location from the database to the location given by the location system) a maintenance or reparation operation may be performed if required at step S6.

Figure 5:
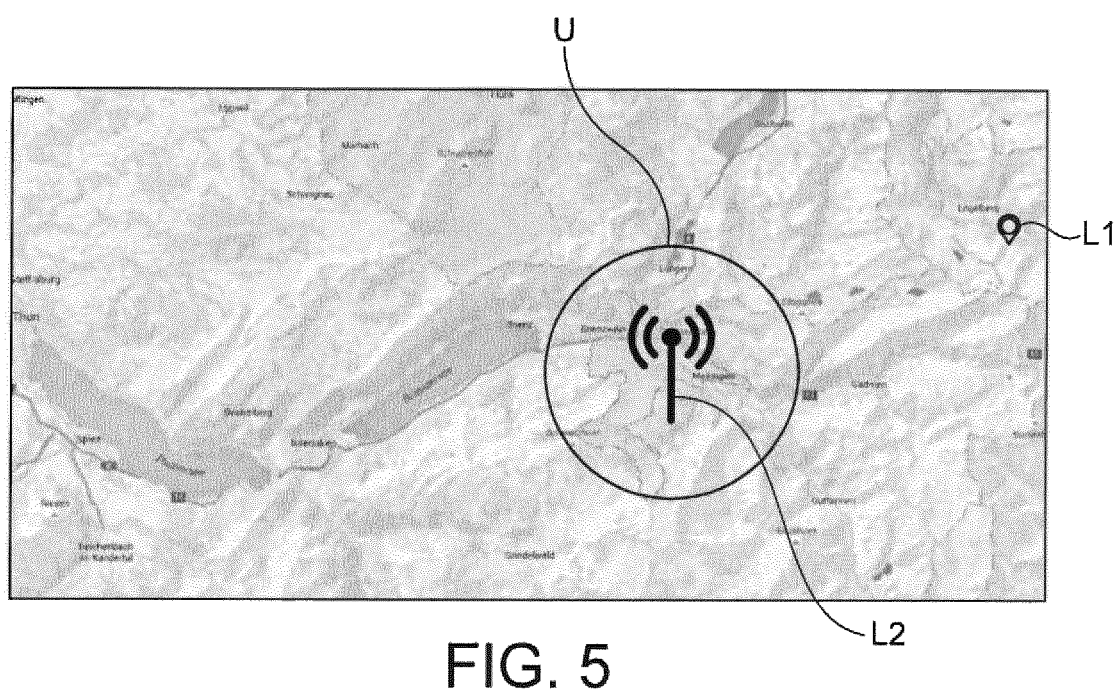
FIG. 5 illustrates on a map an example of a possible use of the invention.

An example of a possible use of the two locations of the same beverage preparation machine is illustrated in FIG. 5. A maintenance centre or a maintenance operator may be provided with an application making it possible to visualize on a map M the location of the beverage machine according to the location database L1 and the location determined by the location system L2. Because the location system have a given measurement uncertainty, depending on the technologies used and other parameters (e.g. the respective positions and distances between antennas of a cellular network when multilateration is used), this uncertainty zone U may be represented as a circle around the location of the machine as determined by the location system.

If the location of the beverage machine issued form the database L1 is included in the uncertainty zone U, the manually entered location issued from the database is probably right, and may be trusted. However, if the location of the beverage machine issued form the database L1 is outside the uncertainty zone U, the manually entered location issued from the database is probably wrong. Depending on the distance shown on the map between said locations, an operator or an automatic system may estimate where the machine should be first sought. For example, if the location of the beverage machine issued form the database L1 is very far from the uncertainty zone, the location determined by the location system L2 may be used as a reference location for searching for the machine. If the location of the beverage machine issued form the database L1 is near to the uncertainty zone, the location issued from the database L1 may be used as a reference location and the location determined by the location system L2 may provide a direction from the reference location to search for the machine, or the contrary, i.e. the location determined by the location system L2 being used as reference location and the location issued from the database L1 to give a search direction from the reference location.

Many beverage preparation machines may be represented on the same map M, which may itself constitute a remote management tool. The map may indicate warning messages for example when a discrepancy in location of a machine is detected, or when a maintenance or repair operation is required on a machine. An icon placed at one or both locations of the machine may be active, for example clickable, to display a status of the machine and potentially adapt certain parameters of said machine.

More generally, the location of the machine determined using the location system 5 may be used in combination with remote management data. The remote management data may be sent via the aforesaid communication interface 132. The remote management data may be selected from a group consisting of: details of beverage material or capsule consumption; a fault detection in the machine (e.g. by one of the aforesaid sensors); a notification that maintenance is required, such as a descaling operation. Typically, this combination of data may help in sending an operator to the right place for refilling the machine, repairing the machine, or performing a periodic maintenance. Other functionality of the machine may be adapted according to the location as determined by the location system. For example, the language used by the machine in a user interface may be pre-set according to the detected location. The characteristics of the delivered beverage (e.g. quantity of beverage concentrate, quantity of sugar, and temperature of delivery, etc.) may be adapted according to the location of the machine or according to parameters of said location (weather forecast for example).

If the location determined by the location system is very reliable and accurate (e.g. if two automatic location systems are provided in the beverage machine and determine the same location, the measurement uncertainties being taken into account), the location database may be automatically updated to indicate a new location of the machine, in complement to or replacement of the previous stored location.

The invention claimed is:

1. A beverage preparation machine for preparing a beverage, the machine comprising: a communication interface for communication with a remote resource;
a location system configured for automatic geolocation of the machine, and in that the location system is configured to transmit to the remote resource, via the communication interface, location information determined by said location system; and
wherein the device is configured to perform a comparison between a location of the machine issued from a database comprising human entered location data and the location information determined by the location system.

2. The beverage preparation machine according to claim 1, wherein the communication interface comprises a wireless modem configured to communicate over a cellular network, the location system being configured to provide location information based on multilateration in the cellular network.

3. The beverage preparation machine according to claim 1, wherein the location system comprises a satellite-based positioning system.

4. The beverage preparation machine according to claim 3, wherein the location system comprises a Global Positioning System.

5. A system for beverage preparation comprising a beverage preparation machine, the machine comprising: a communication interface for communication with a remote resource, and a location system configured for automatic geolocation of the machine, and in that the location system is configured to transmit to the remote resource, via the communication interface, location information determined by said location system; and a remote resource to which the machine is configured to send location information, wherein the remote resource hosts a database comprising a human entered location of the machine, and wherein the system is configured for comparing the location of the machine from the database and a location determined by the location system.

6. The system according to claim 5, configured so that, if a discrepancy between the location of the machine from the database and a location determined by the location system is detected, then:
if the location from the database is judged to have been input incorrectly or to be out of date, the system allows an operator at said remote resource to enter a corrected location or to accept the location sent by the machine; and
if the machine does not determine a machine location correctly due to an error with its location system, the system uses the location of the machine from the database.

7. A method of remote management of a beverage preparation machine, the machine for preparing a beverage and comprising a communication interface for communication with a remote resource and being configured to transmit location information to the remote resource, the method comprising:
obtaining automatic location information from a location system of the machine;
using the location information for a remote management operation of the machine; and
wherein the remote management operation comprises a comparison between the location of the machine issued from a database comprising human entered location data and a location determined by the location system.

8. The method according to claim 7, wherein a discrepancy is detected when a distance between the location of the machine from the database and a location determined by the location system exceeds a predefined threshold.

9. The method according to claim 8, wherein the threshold is set to:
between 500 m and 20 km, if the automatic geolocation of the machine relies on multilateration in a cellular network;
between 100 m and 1 km, if the automatic geolocation of the machine uses a satellite-based positioning system.

10. The method according to claim 8, in which the management operation comprises, if a discrepancy between the location of the machine from the database and a location determined by the location system is detected:
if the location from the database is judged to have been input incorrectly or to be out of date, allowing an operator at said remote resource to enter a corrected location or to accept the location sent by the machine; and
if the machine does not determine a machine location correctly due to an error with its location system, using the location of the machine from the database.

11. The method according to claim 8, in which if a discrepancy between the location of the machine from the database and a location determined by the location system is detected and if the machine is judged to have been moved without authorisation, then the machine is remotely disabled, and/or a warning item is sent to the machine and displayed on an end user interface thereof.

12. The method according to claim 7, in which the location information is sent by the machine upon reception of a request from the remote resource, and/or at predetermined time intervals.

13. The method according to claim 7, in which remote management data is transmitted from the machine, the data being selected from the group consisting of: data requesting maintenance/repair machine; data to diagnose a fault of the machine; and data related to consumption of beverage material or other consumable used by the machine.

* * * * *